United States Patent
Kojima et al.

(10) Patent No.: US 11,888,142 B2
(45) Date of Patent: Jan. 30, 2024

(54) POWDER APPLICATION APPARATUS

(71) Applicant: Panasonic Intellectual Property Management Co., Ltd., Osaka (JP)

(72) Inventors: Toshiyuki Kojima, Kyoto (JP); Motohiro Okochi, Osaka (JP); Shunichi Matsuno, Kyoto (JP); Akihiro Horikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 137 days.

(21) Appl. No.: 17/232,395

(22) Filed: Apr. 16, 2021

(65) Prior Publication Data
US 2021/0351393 A1    Nov. 11, 2021

(30) Foreign Application Priority Data

May 11, 2020    (JP) .................................. 2020-083282

(51) Int. Cl.
*H01M 4/04*        (2006.01)
*B05C 19/00*       (2006.01)
(Continued)

(52) U.S. Cl.
CPC ......... *H01M 4/0404* (2013.01); *B05C 11/028* (2013.01); *B05C 19/008* (2013.01);
(Continued)

(58) Field of Classification Search
CPC ............. H01M 4/0404; H01M 4/0435; H01M 10/0525; H01M 2004/021;
(Continued)

(56) References Cited

U.S. PATENT DOCUMENTS 4,354,810 A  * 10/1982  Stidham .................. B05D 1/40
                                                         118/103
2010/0080896 A1* 4/2010  Bachmann .............. B05C 19/04
                                                         118/308
(Continued)

FOREIGN PATENT DOCUMENTS

JP      2004-255853       9/2004
JP      2005-238723       9/2005
(Continued)

OTHER PUBLICATIONS

DE4325573, Herrmann, Apparatus for the gradual application of powder layers one on top of the other, published Feb. 2, 1995 (including English abstract). (Year: 1995).*

(Continued)

*Primary Examiner* — Dah-Wei D. Yuan
*Assistant Examiner* — Stephen A Kitt
(74) *Attorney, Agent, or Firm* — Wenderoth, Lind & Ponack, L.L.P.

(57) ABSTRACT

A powder application apparatus includes a transport device, a powder supplier, a squeegee, and an ultra-high frequency vibration generator. The transport device is configured to move a sheet in a predetermined direction. The powder supplier is configured to supply powder on a surface of the sheet. The squeegee is positioned at a distance from the sheet, and the powder supplier is configured to adjust a thickness of the powder supplied onto the surface of the sheet. The ultra-high frequency vibration generator is configured to vibrate the squeegee at a frequency of 2 kHz or more and 300 kHz or less.

6 Claims, 9 Drawing Sheets

(51) Int. Cl.
  *B05C 11/02* (2006.01)
  *C23C 24/02* (2006.01)
  *H01M 10/0525* (2010.01)
  *H01M 4/02* (2006.01)
  *B05C 19/04* (2006.01)

(52) U.S. Cl.
  CPC ..... *H01M 4/0435* (2013.01); *H01M 10/0525* (2013.01); *B05C 19/04* (2013.01); *C23C 24/02* (2013.01); *H01M 2004/021* (2013.01); *H01M 2004/028* (2013.01)

(58) Field of Classification Search
  CPC ... H01M 2004/028; H01M 2300/0068; H01M 4/13; H01M 4/139; H01M 4/62; H01M 10/0562; H01M 2004/027; B05C 19/008; B05C 11/028; B05C 19/04; B05C 19/06; Y02E 60/10; C23C 24/02
  USPC .......................................................... 118/120
  See application file for complete search history.

(56) References Cited

U.S. PATENT DOCUMENTS

| | | |
|---|---|---|
| 2016/0043382 A1 | 2/2016 | Tanihara et al. |
| 2016/0181651 A1* | 6/2016 | Tanihara et al. ..... H01M 4/0435 118/103 |
| 2016/0288265 A1 | 10/2016 | Suzuki et al. |
| 2018/0340294 A1* | 11/2018 | Maehara ................. B05D 1/12 |

FOREIGN PATENT DOCUMENTS

| | | |
|---|---|---|
| JP | 2007-294400 | 11/2007 |
| JP | 2014-198293 | 10/2014 |
| JP | 2015-196252 | 11/2015 |
| JP | 2016-071956 | 5/2016 |
| WO | 2016/002139 | 1/2016 |
| WO | 2022/196363 | 9/2022 |

OTHER PUBLICATIONS

Extended European Search Report dated Oct. 11, 2021 for the related European Patent Application No. 21167364.5.

Communication pursuant to Article 94(3) EPC dated Sep. 27, 2023 in European Patent Application No. 21167364.5.

* cited by examiner

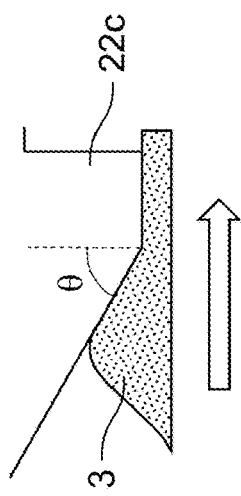 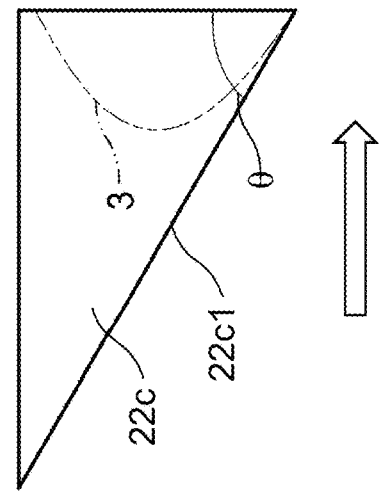
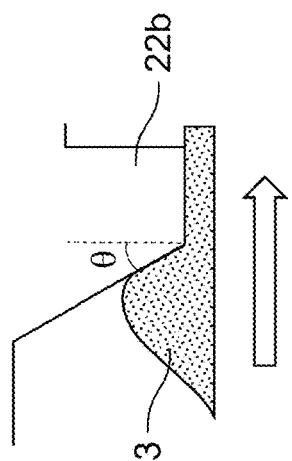 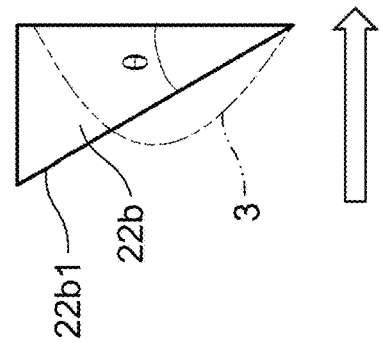
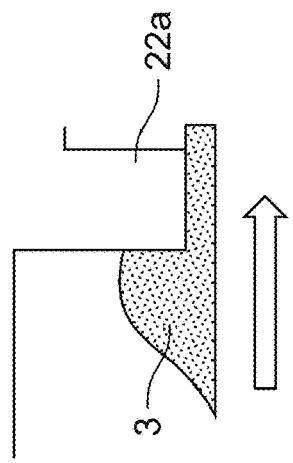 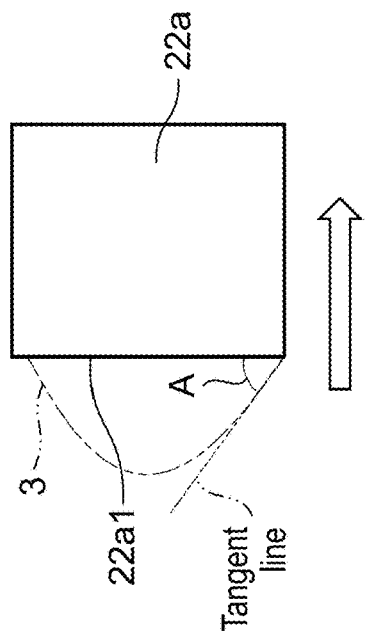

FIG. 10

|  | Example 1 | Comparative example 1 |
|---|---|---|
| Vibration frequency | 35kHz | 320Hz |
| Powder film thickness variation | 4% | 161% |

FIG. 11

|  | Example | | | | Comparative example | | |
|---|---|---|---|---|---|---|---|
|  | 2 | 3 | 4 | 5 | 2 | 3 | 4 |
| Angle | 60° | 30° | 0° | 30° | 60° | 30° | 0° |
| Presence or absence of vibration | Present | Present | Present | Present | Absent | Absent | Absent |
| Vibration direction | Perpendicular | Perpendicular | Perpendicular | Horizontal | — | — | — |
| Staying powder ratio | 0% | 16% | 17% | 21% | 23% | 30% | 30% |

POWDER APPLICATION APPARATUS

BACKGROUND

1. Technical Field

The present disclosure relates to a powder applying apparatus, an energy device manufacturing method, a positive electrode for a battery, and a negative electrode for a battery.

2. Description of the Related Art

In the related art, there is known a technique of applying powder on a surface of a member while transporting a member such as a metal foil.

For example, Japanese Patent Unexamined Publication No. 2014-198293 discloses a technique of applying a composite material (powder) containing an active material on the surface of a current collector which is a long metal foil.

Japanese Patent Unexamined Publication No. 2014-198293 describes that the thickness of the powder is uniformly adjusted by supplying the powder onto the surface of the metal foil and then flattening the powder with a squeegee. In Japanese Patent Unexamined Publication No. 2014-198293, the fluidity of the powder is improved by performing the powder granulation step.

SUMMARY

According to an aspect of the disclosure, there is provided a powder applying apparatus including: a driver that moves a member in a predetermined direction; a powder supplier that supplies powder onto a surface of the member; and a squeegee having a distance from the member, the squeegee adjusting a thickness of the powder supplied onto the surface of the member by the powder supplier. The squeegee vibrates at a frequency of 2 kHz or more and 300 kHz or less.

According to another aspect of the disclosure, there is provided an energy device manufacturing method including: supplying powder onto a surface of a member while moving the member in a predetermined direction; and adjusting a thickness of the powder supplied onto the surface by using a squeegee. The squeegee has a distance from the member. The squeegee vibrates at a frequency of 2 kHz or more and 300 kHz or less.

According to still another aspect of the disclosure, there is provided a positive electrode for a battery including: a positive electrode current collector; and a positive electrode layer containing a positive electrode active material and formed on the positive electrode current collector, in which a concentration of a solvent contained in the positive electrode layer is 50 ppm or less, an area of the positive electrode layer is 900 $mm^2$ or more, a thickness of the positive electrode layer is 15 μm or more, and a variation in the thickness of the positive electrode layer is ±5% or less.

BRIEF DESCRIPTION OF THE DRAWINGS

FIG. 3A is a schematic view illustrating a part of the powder applying apparatus according to the embodiment of the disclosure;

FIG. 3B is a schematic view illustrating a part of the powder applying apparatus according to the embodiment of the disclosure;

FIG. 3C is a schematic view illustrating a part of the powder applying apparatus according to another embodiment of the disclosure;

FIG. 3D is a schematic view illustrating a part of the powder applying apparatus according to another embodiment of the disclosure;

FIG. 3E is a schematic view illustrating a part of the powder applying apparatus according to still another embodiment of the disclosure;

FIG. 3F is a schematic view illustrating a part of the powder applying apparatus according to still another embodiment of the disclosure;

FIG. 10 illustrates a comparison result of powder film thickness variation after passing through a squeegee;

FIG. 11 illustrates analysis result of a staying particle ratio;

DETAILED DESCRIPTION OF PREFERRED EMBODIMENTS

Figure 9:
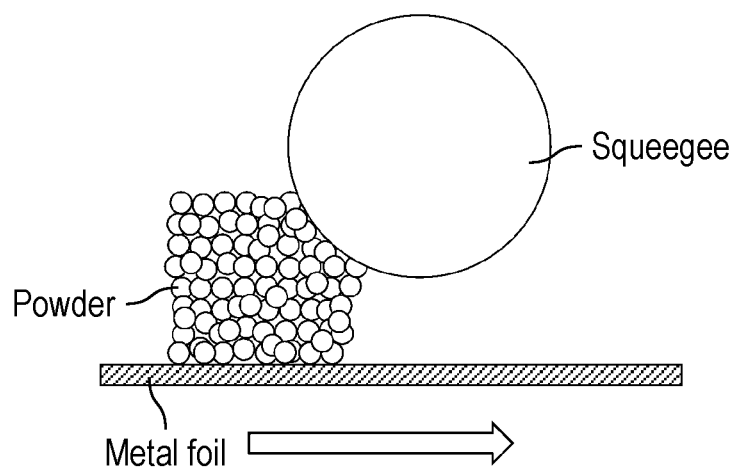
FIG. 9 is a schematic view illustrating a part of a powder applying apparatus of the related art.

As illustrated in FIG. 9, when powder comes into contact with a squeegee, the powder receives a force in a direction opposite to the moving direction (the transport direction of a metal foil), and thus, in a case where the fluidity of the powder is low, the powder is likely to stay on the upstream side of the squeegee in the transport direction of the metal foil, that is, a bridge is likely to occur between the squeegee and the metal foil. In Japanese Patent Unexamined Publication No. 2014-198293, in order to suppress the stay of the powder, the squeegee is vibrated at a frequency of approximately 700 Hz. The white arrow in FIG. 9 indicates the transport direction of a web.

However, even when the squeegee is vibrated at a frequency of approximately 700 Hz as described in Japanese Patent Unexamined Publication No. 2014-198293, the stay of powder having low fluidity cannot be sufficiently suppressed. Even in a case where the fluidity of the powder is high, it is difficult to flatten the powder such that the thickness of the powder supplied onto the surface of the member becomes uniform with high accuracy.

An object of the present disclosure is to provide a powder applying apparatus, an energy device manufacturing method, a positive electrode for a battery, and a negative electrode for a battery, capable of forming a powder layer having little variation in the film thickness on the surface of the member.

The powder applying apparatus of the disclosure includes: a driver that moves a member in a predetermined direction; a powder supplier that supplies powder onto a surface of the member; and a squeegee that is disposed so as to form a gap between the member and the squeegee and that adjusts a thickness of the powder supplied onto the surface of the member by the powder supplier. In the powder applying apparatus, the squeegee vibrates at a frequency of 2 kHz or more and 300 kHz or less.

According to the present disclosure, the powder layer having little variation in the film thickness can be formed on the surface of the member.

In the powder applying apparatus of the disclosure, the powder is continuously supplied onto the surface of the member by using the powder supplier while moving the member by a driver. At this time, the powder supplied onto the surface of the member passes through the gap between the squeegee and the surface of the member, and accordingly, the thickness of the powder supplied onto the surface of the member is adjusted to be substantially the same as the width of the gap. At this time, when the powder comes into contact with the squeegee, pressure is generated on the powder, and the powder stays or aggregates between the squeegee and the member, and accordingly, the powder clogging is likely to occur. However, in the powder applying apparatus of the disclosure, since the squeegee vibrates at a frequency of 2 kHz or more and 300 kHz or less, the fluidity of the powder can be increased, and thus, the powder does not easily stay or aggregate, and the powder clogging can be suppressed.

Each of the embodiments described below is a comprehensive or specific example. Numerical values, shapes, materials, configuration elements, arrangement positions and connection forms of configuration elements, steps, order of steps, and the like, which are illustrated in the following embodiments are examples, and are not intended to limit the disclosure. Among the configuration elements in the following embodiments, the configuration elements not described in the independent claims will be described as any configuration element.

Each drawing is a schematic view and is not necessarily exactly illustrated. In each drawing, the same configuration members will be given the same reference numerals. In the following embodiments, expressions such as "substantially parallel" will be used. For example, "substantially parallel" not only means being perfectly parallel, but also means being substantially parallel, that is, means a state including an error of, for example, approximately several percent. "Substantially parallel" means being parallel to the extent that the effects of the disclosure can be achieved. The same applies to expressions using other "substantially".

Hereinafter, embodiments will be described with reference to the drawings as appropriate. However, more detailed description than necessary may be omitted. For example, detailed description of already well-known matters and duplicate descriptions for substantially the same configuration may be omitted. This is to avoid unnecessary redundancy of the following description and to make it easy for those skilled in the art to understand.

Hereinafter, embodiments of the disclosure will be described with reference to the drawings.

EXEMPLARY EMBODIMENT

Hereinafter, powder applying apparatus 1 which is an embodiment of a powder applying apparatus according to the disclosure will be described with reference to FIGS. 1 to 2.

Powder applying apparatus 1 is an apparatus that applies powder 3 on surface 4a of sheet 4 while transporting the sheet-shaped member (hereinafter, also referred to as sheet 4) by transport device 9 which is driving means. Specifically, powder applying apparatus 1 is an apparatus that continuously supplies powder 3 onto the surface of sheet 4 by using powder supplier 11 while transporting sheet 4 by transport device 9, and forms compressed powder layer 5 on the surface of sheet 4 by combining sheet 4 and powder 3 on sheet 4 and continuously compressing powder 3 by roll press 6.

Transport device 9 is a driver that moves sheet 4 in a predetermined direction, and is not particularly limited as long as sheet 4 can be transported. In the embodiment, transport device 9 continuously feeds out sheet 4 wound in a roll shape, but the disclosure is not limited thereto, and transport device 9 may intermittently feed out sheet 4. Transport device 9 is an example of a driver. In a case where wound sheet 4 is continuously transported as in the embodiment, sheet 4 having compressed powder layer 5 formed on surface 4a may be wound again in a roll shape and collected. A guide roller that rotates with the movement of sheet 4, a control device that corrects the meandering of sheet 4, and the like may be provided on the transport path of sheet 4.

In the embodiment, sheet 4 is a long thin plate and is wound, but the member is not limited to such sheet 4. New sheet 4 may be fed out from transport device 9 after sheet 4 having a desired shape is fed out from transport device 9 and the applying of powder 3 is completed. Sheet 4 may not have to be wound in a roll shape. The member is not limited to sheet 4, and may have a shape that makes it possible to apply powder 3 by using powder applying apparatus 1. In the embodiment, sheet 4 is a current collector containing a metal foil, but the material is not particularly limited as long as the member is a member capable of applying powder 3 by using powder applying apparatus 1.

Powder 3 may be a powdery substance, and the raw material, composition, and particle shape are not particularly limited. In the embodiment, powder 3 is a group of particles containing an active material.

The mean particle size (D50) of powder 3 is preferably 0.005 μm or more and 50 μm or less. In this case, the fluidity of powder 3 is likely to decrease, but since the stay and aggregation of powder 3 are suppressed by the vibration of squeegee 2, compressed powder layer 5 having little thickness variation can be formed on surface 4a of sheet 4. The mean particle size (D50) is a volume-based median size calculated from the measured value of the particle size distribution by the laser diffraction and scattering method, and can be measured by using a commercially available laser analysis and scattering type particle size distribution measuring device.

Powder 3 may contain only one type of powder, or may contain two or more types of powders. In a case where powder 3 is a mixture powder formed of a plurality of types of powder, and in a case where squeegee 2 is subjected to high frequency vibration in the vicinity of the ultrasonic band to flatten powder 3, the dispersibility of a plurality of types of powder in powder 3 is improved. In other words, in powder 3, a plurality of types of powder are likely to be dispersed with each other, and it is difficult for a specific type of powder to be unevenly laminated on sheet 4. It is considered that this is because the high frequency vibration in the vicinity of the ultrasonic band of squeegee 2 transmits the high frequency vibration in the vicinity of the ultrasonic band to the place where powder 3 before reaching squeegee 2 stays, and by the vibration and flow of the plurality of types of particles that configure powder 3, the plurality of types of particles that configure powder 3 are mixed with each other and the dispersibility is improved.

In the embodiment, a hopper is used as powder supplier 11. The hopper stores powder 3 therein and supplies powder 3 onto surface 4a of sheet 4. The hopper is disposed on the upstream side of sheet 4 in the moving direction from the position (hereinafter, referred to as "press position") where the outer peripheral surfaces of the pair of roll presses 6 described later are closest to each other. Powder 3 supplied onto surface 4a of sheet 4 reaches the press position as sheet 4 moves. In the embodiment, the hopper is used as powder supplier 11, but the disclosure is not limited thereto, and an apparatus capable of supplying powder 3 onto surface 4a of sheet 4 may be used.

Compressed powder layer 5 is a layer formed by compressing powder 3.

Figure 1:
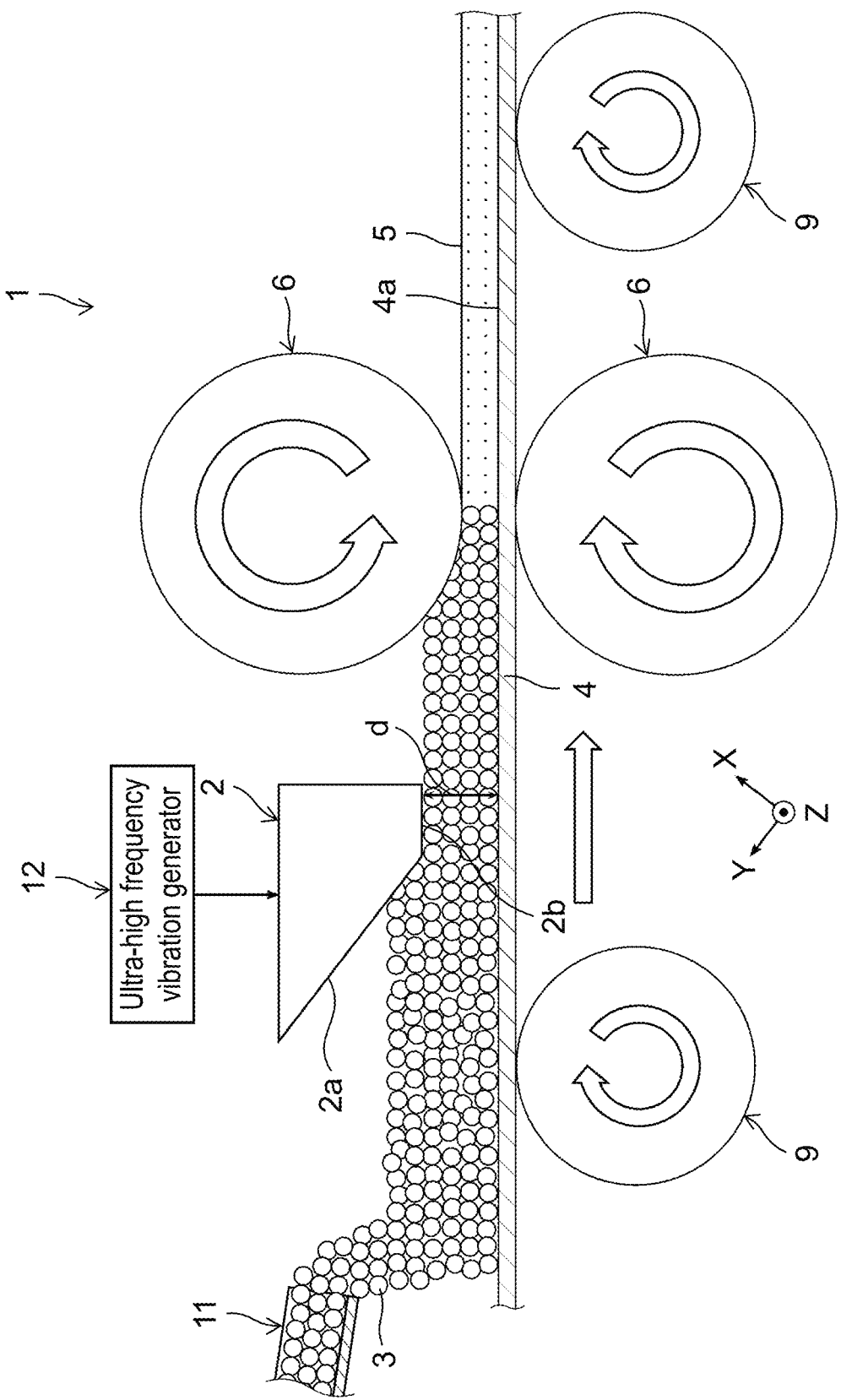
FIG. 1 is a schematic view illustrating a powder applying apparatus according to an embodiment of the disclosure.
Figure 2:
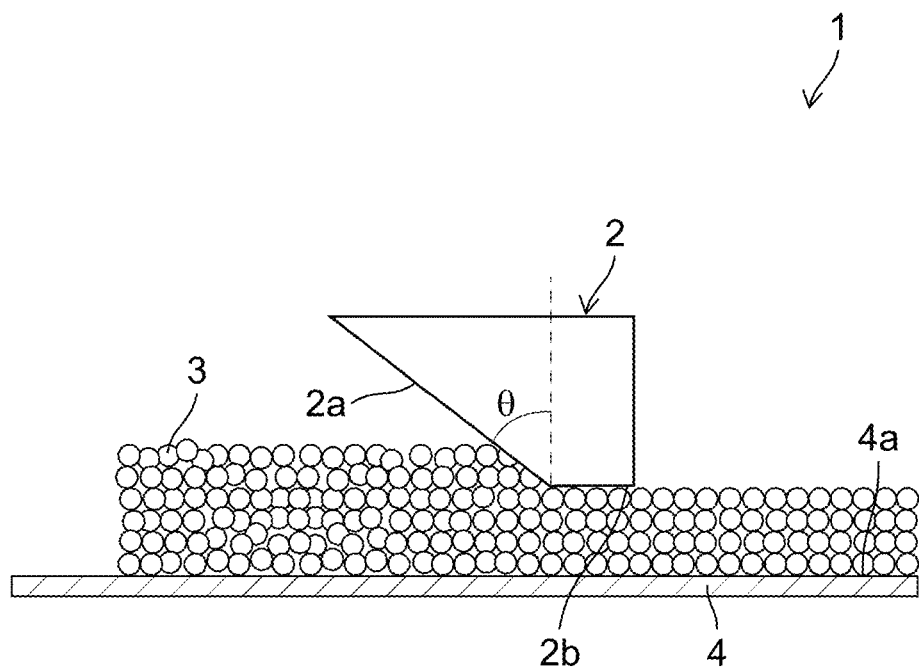
FIG. 2 is a schematic view illustrating a part of the powder applying apparatus according to the embodiment of the disclosure.

As illustrated in FIG. 1, powder applying apparatus 1 may further have the pair of roll presses 6 as pressers. The pair of roll presses 6 compress powder 3 on sheet 4 of which the thickness has been adjusted by squeegee 2.

Each of the pair of roll presses 6 has a columnar shape, and the axes of the pair of roll presses 6 are provided so as to be substantially parallel to each other. As illustrated in FIG. 1, the pair of roll presses 6 are provided so as to sandwich sheet 4 at a predetermined distance from each other. Specifically, the outer peripheral surface of one roll press 6 is provided so as to face one surface of sheet 4, and the outer peripheral surface of the other roll press 6 is provided so as to face the other back surface of sheet 4. The pair of roll presses 6 are rotationally driven by a driving device (not illustrated) in opposite directions (directions of arrows in the pair of roll presses 6 illustrated in FIG. 1).

Powder applying apparatus 1 has squeegee 2. Squeegee 2 makes the film thickness of powder 3 supplied onto surface 4a of sheet 4 uniform, and reduces the variation in the film thickness. In other words, squeegee 2 adjusts the thickness of powder 3 supplied onto surface 4a of sheet 4 by powder supplier 11.

Squeegee 2 is disposed on the downstream side of sheet 4 in the moving direction from the hopper and on the upstream side of sheet 4 in the moving direction from the press position such that a predetermined gap is formed between squeegee 2 and sheet 4.

In powder applying apparatus 1 of the embodiment, powder 3 supplied from the hopper onto surface 4a of sheet 4 is leveled by squeegee 2 until reaching the press position as sheet 4 moves. At the press position, powder 3 supplied onto the surface of sheet 4 is pressurized on the surface of sheet 4. In this manner, compressed powder layer 5 is formed on surface 4a of sheet 4.

In the following, squeegee 2 will be described in detail with reference to FIGS. 1 and 2.

Squeegee 2 adjusts the thickness (vertical dimension in FIG. 2) of powder 3 to be constant by flattening powder 3 supplied onto surface 4a of sheet 4. A predetermined gap is formed between squeegee 2 and sheet 4, and powder 3 supplied onto surface 4a of sheet 4 passes through the gap. Accordingly, the thickness of powder 3 changes so as to be shortest distance d between the tip (the part facing surface 4a) of squeegee 2 and surface 4a of sheet 4.

It is preferable that squeegee 2 is configured to be movable with respect to sheet 4 such that distance d can be changed.

In the embodiment, squeegee 2 has a trapezoidal shape when viewed from the side as illustrated in FIG. 1. Squeegee 2 has main surface 2a that faces surface 4a of sheet 4 and is inclined with respect to a plane parallel to surface 4a, and end surface 2b that is substantially parallel to sheet 4.

Main surface 2a is a surface that inclines downward in the moving direction of powder 3 and intersects the moving direction of powder 3 supplied onto surface 4a. Main surface 2a is in contact with moving powder 3 to level powder 3 with respect to surface 4a.

End surface 2b is formed along the moving direction of powder 3 and is a surface substantially parallel to surface 4a. For end surface 2b, the surface of powder 3 leveled so as to have thickness d (shortest distance) at the lower end edge (edge closest to surface 4a) of main surface 2a is further leveled by a predetermined length. The predetermined length is a length of end surface 2b in the direction parallel to the moving direction. End surface 2b is not always necessary, and there may be an apex instead of end surface 2b.

Stay Mechanism

Powder 3 comes into contact with main surface 2a of squeegee 2 when moving toward the gap between squeegee 2 and sheet 4 together with the movement of sheet 4. At this time, pressure is generated on powder 3 due to the movement of sheet 4 with respect to squeegee 2, and in a case of powder 3 having low fluidity, powder 3 stays or aggregates between squeegee 2 and sheet 4, and powder clogging is likely to occur.

In particular, in a case where powder 3 having a particle size of 50 μm or less is used, the fluidity is likely to decrease, and thus, powder clogging is likely to occur.

Even in powder 3 having high fluidity, it is difficult to accurately make the film thickness of powder 3 after passing through squeegee 2 uniform due to the influence of stay. This is because the stay and releasing of powder 3 are repeated in a small range.

High Frequency Vibration in Vicinity of Ultrasonic Band

Ultra-high frequency vibration generator 12 for vibrating is connected to squeegee 2. Specifically, ultra-high frequency vibration generator 12 applies high frequency vibration in the vicinity of the ultrasonic band to squeegee 2, and accordingly, squeegee 2 vibrates at a high frequency in the vicinity of the ultrasonic band. Ultra-high frequency vibration generator 12 can vibrate squeegee 2 at a frequency of 2 kHz or more and 300 kHz or less. Ultra-high frequency vibration generator 12 may or may not be included in the configuration requirements of powder applying apparatus 1.

Squeegee 2 vibrates at a frequency of 2 kHz or more and 300 kHz or less when sheet 4 moves. In other words, squeegee 2 vibrates at a high frequency in the vicinity of the ultrasonic band when sheet 4 moves. By vibrating squeegee 2 at a high frequency in the vicinity of the ultrasonic band, the vibration of squeegee 2 is transmitted to powder 3 to increase the fluidity of powder 3, and thus, the powder clogging is suppressed.

The fluidity of powder 3 is likely to increase as the frequency of vibration of squeegee 2 increases. Therefore, the fluidity of powder 3 can be sufficiently increased by vibrating squeegee 2 at a frequency of 2 kHz or more in a high frequency region in the vicinity of the ultrasonic band. However, when the frequency is extremely high, the high frequency in the vicinity of the ultrasonic band is likely to be attenuated, and thus, the farther away from squeegee 2, the more difficult the vibration is transmitted. Therefore, when the frequency is 300 kHz or less, the fluidity of powder 3 can be sufficiently increased even in a place where powder clogging is likely to occur. When squeegee 2 vibrates at a high frequency in the vicinity of the ultrasonic band, powder 3 which is in contact with squeegee 2 is less likely to receive frictional resistance due to the powder pressure, the fluidity is increased, and accordingly, the stay and aggregation of powder 3 are suppressed.

Regarding powder 3 positioned in the vicinity of squeegee 2, the frictional force between the particles that configure powder 3 is reduced due to the vibration effect of squeegee 2, the fluidity is increased, and accordingly, the powder aggregation is suppressed.

Accordingly, even in powder 3 having a particle size of 50 μm or less and low fluidity, the vibrating squeegee 2 allows powder 3 to pass through without stay or aggregation.

Even in powder 3 having high fluidity, the flow is further promoted, and the film thickness of powder 3 after passing through squeegee 2 can be made uniform with greater accuracy.

Direction and Magnitude of High Frequency Vibration in Vicinity of Ultrasonic Band The high frequency vibration direction in the vicinity of the ultrasonic band of squeegee 2 includes at least one of a component in the perpendicular direction, a component in the horizontal direction, and a component in the surface direction. In other words, squeegee 2 vibrates in at least one of the perpendicular direction, the horizontal direction, and the surface direction.

The perpendicular direction is a direction perpendicular to main surface 2a of squeegee 2. In the embodiment illustrated in FIG. 1, the perpendicular direction is substantially parallel to the X direction. Regarding the vibration in the perpendicular direction, a longitudinal wave (a wave in the vibration direction in which squeegee 2 approaches and is separated from powder 3) is likely to be transmitted to powder 3.

The component in the perpendicular direction has a great effect on reducing the frictional resistance between powders 3. Since the vibration in the perpendicular direction is in the vibration direction in which squeegee 2 approaches and is separated from powder 3, the particles of powder 3 repeatedly collide with each other, and the vibration is likely to be transmitted to entire powder 3. Since the high frequency in the vicinity of the ultrasonic band has a high frequency, it is considered that the vibration is unlikely to be transmitted to the entire powder 3, but when the vibration is in the perpendicular direction, the vibration is particularly likely to be transmitted to powder 3.

In particular, the vibration component in the perpendicular direction can move powder 3 significantly in the reservoir where powder 3 is likely to accumulate. Accordingly, the particles of powder 3 are more likely to collide with each other in the reservoir, and thus, powder 3 is more dispersed.

The horizontal direction is a direction substantially parallel to main surface 2a of squeegee 2 and substantially parallel to the axis of squeegee 2. In the embodiment illustrated in FIG. 1, the horizontal direction is substantially parallel to the Z direction. Regarding the vibration in the horizontal direction, a transverse wave (a wave in the direction in which squeegee 2 vibrates by rubbing against powder 3) is likely to be transmitted to powder 3. The axis of squeegee 2 means being substantially parallel to the longitudinal direction of squeegee 2.

The surface direction is a direction substantially parallel to main surface 2a of squeegee 2 and perpendicular to the axis of squeegee 2. In the embodiment illustrated in FIG. 1, the surface direction is substantially parallel to the Y direction. Regarding the vibration in the surface direction, a transverse wave (a wave in the direction in which squeegee 2 vibrates by rubbing against powder 3) is likely to be transmitted to powder 3.

Figure 12B:
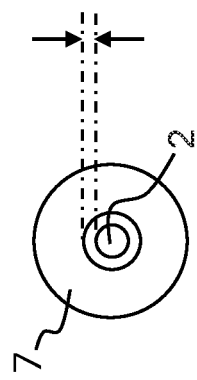
FIG. 12B is a schematic view illustrating a part of the powder applying apparatus according to an embodiment of the disclosure.
Figure 12A:
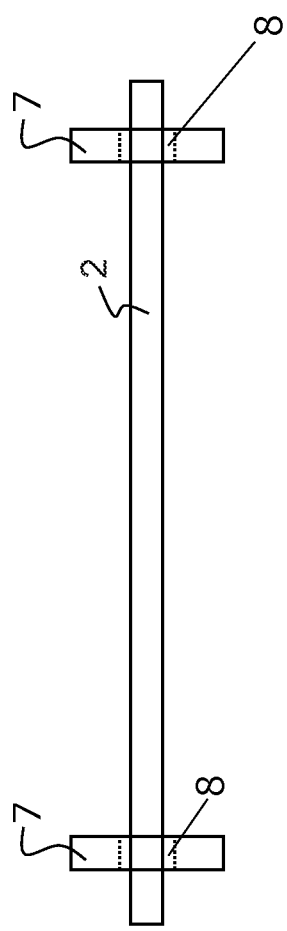
FIG. 12A is a schematic view illustrating a part of the powder applying apparatus according to an embodiment of the disclosure.

The components in the horizontal direction and the surface direction of the high frequency vibration in the vicinity of the ultrasonic band of squeegee 2 greatly contribute to the reduction of the frictional force between squeegee 2 and powder 3 in addition to the reduction of the frictional resistance between powders 3. When the vibration component in the perpendicular direction is made extremely large, the vibration may be transmitted too much, powder 3 vibrates greatly, and there is a possibility that the film thickness variation is large. However, since the vibration component in the horizontal direction can also reduce the frictional force between squeegee 2 and powder 3, the fluidity of powder 3 can be particularly increased. The vibration of squeegee 2 in the horizontal direction can be realized by attaching a high frequency transducer in the axial direction of squeegee 2 and receiving the end of squeegee 2 with a bearing 7, as shown in FIGS. 12A and 12B, and thus, there is a possibility that the device structure is simpler than the vibration in the surface direction. By inserting the axis of squeegee 2 into a circular bearing bore 8, the relationship of (amplitude in the horizontal direction)>(amplitude in the perpendicular direction) can be created.

The direction of the high frequency vibration in the vicinity of the ultrasonic band of squeegee 2 may be only the perpendicular direction, only the horizontal direction, or only the surface direction. However, when high frequency vibration in the vicinity of the ultrasonic band in both the perpendicular direction and the horizontal direction is used in combination, the fluidity of powder 3 can further be enhanced. In a case of focusing on one particle of powder 3, the vibration direction of the particles becomes random, the vibration is transmitted to the entire surface of powder 3 on the upstream side of squeegee 2, and thus, the surface with high frictional resistance disappears without vibration being transmitted, and the fluidity increases.

In a case where squeegee 2 vibrates at a high frequency in the vicinity of the ultrasonic band in the perpendicular direction and the horizontal direction, the magnitude of squeegee 2 in the horizontal direction is preferably larger than the magnitude of squeegee 2 in the perpendicular vibration. In other words, in squeegee 2, the magnitude of vibration of the transverse wave component (the direction in which squeegee 2 vibrates by rubbing against powder 3) of powder 3 is preferably the magnitude larger than the magnitude of the vibration of the longitudinal wave component (the vibration direction in which squeegee 2 approaches and is separated from powder 3) of powder 3. In this case, the frictional resistance at the interface (for example, main surface 2a and end surface 2b) between squeegee 2 and powder 3 where the frictional resistance is likely to be particularly high can be reduced by the vibration of squeegee 2 in the horizontal direction, the frictional resistance between powders 3 can also be reduced, and thus, the fluidity of powder 3 can further be improved.

The magnitude of vibration of squeegee 2 in the perpendicular direction, that is, the amplitude of squeegee 2 in the perpendicular direction is preferably 2 μm or more. In this case, the frictional resistance between powders 3 can be sufficiently reduced, and the fluidity of powder 3 can further be increased.

The magnitude of the vibration of squeegee 2 in the horizontal direction is preferably 4 μm or more. In other words, the amplitude of squeegee 2 in the horizontal direction is preferably 4 μm or more. In this case, the frictional resistance of the interface between squeegee 2 and powder 3 can be sufficiently reduced, and the fluidity of powder 3 can further be increased.

Inclination Angle of Squeegee

The inclination angles of squeegees 22a to 22c will be described in detail with reference to FIGS. 3A to 3F. Squeegees 22a to 22c are examples of squeegees 2. FIGS. 3B, 3D, and 3F illustrate the angle of repose model of powder 3. Angle of repose A is an angle made by a slope and a horizontal surface of a mountain of powder 3 to be formed when powder 3 is dropped onto the sheet from a certain height and powder 3 is maintained stable in a mountain shape without spontaneously collapsing. Since powder 3 flows in the direction of the white arrow, the starting point of the arrow is considered as above (upstream side) the angle of repose model of powder 3. Therefore, as illustrated in FIGS. 3B, 3D, and 3F, a state where powder 3 maintains the stability in a mountain shape is expressed by rotating by 90° as illustrated by the two-dot chain line. The slope is indicated by the tangent line of the two-dot chain line, and the horizontal surface is indicated by main surface 22a1 of squeegee 22a. Angle of repose A is exemplified only in FIG. 3B, but the same applies to FIGS. 3D and 3F, and the illustration thereof will be omitted. In FIGS. 3A to 3F, the illustration of the sheet will be omitted.

FIGS. 3A and 3B illustrate a case where angle θ of main surface 22a1 of squeegee 22a with respect to the longitudinal direction is 0°. The longitudinal direction means a direction (also referred to as a perpendicular direction of the member) perpendicular to sheet 4 which is a member. Main surface 22a1 of squeegee 22a is a surface of the outer peripheral surface of squeegee 22a that adjusts the thickness of powder 3.

In this case, as illustrated in FIGS. 3A and 3B, in a case where the angle of repose of powder 3 is A, powder 3 that has reached main surface 22a1 of squeegee 22a is less likely to collapse, and powder 3 is likely to stay. However, since squeegee 22a vibrates at a high frequency in the vicinity of the ultrasonic band, even when angle θ of main surface 22a1 of squeegee 22a with respect to the longitudinal direction is 0°, the vibration is transmitted to powder 3, the fluidity of the particles is increased, and thus, the stay of powder 3 can be reduced.

As illustrated in FIGS. 3C and 3D, angle θ of main surface 22b1 of squeegee 22b with respect to the longitudinal direction is preferably larger than 0°. In other words, angle θ formed by main surface 22b1 of squeegee 22b which is in contact with powder 3 with respect to the perpendicular direction of sheet 4 is preferably larger than 0°. FIGS. 3C and 3D illustrate a case where angle θ is larger than 0°. Since powder 3 comes into contact with main surface 22b1 of squeegee 22b in the direction of the white arrow, when angle θ is larger than 0°, the stability of powder 3 due to angle of repose A becomes low, and thus, the force with which powder 3 desires to stay on main surface 22b1 of the squeegee 22b is likely to decrease. Therefore, it is possible to further suppress the stay or aggregation of powder 3 and occurrence of powder clogging.

As illustrated in FIGS. 3E and 3F, it is particularly preferable that angle θ of the main surface 22c1 of squeegee 22c with respect to the longitudinal direction is equal to or greater than angle of repose A of powder 3. In other words, angle θ formed by main surface 22c1 of squeegee 22c with respect to the perpendicular direction of sheet 4 is particularly preferably substantially the same as angle of repose A of powder 3. FIGS. 3E and 3F illustrate a case where angle θ is equal to or greater than angle of repose A. Since powder 3 comes into contact with main surface 22c1 of squeegee 22c in the direction of the white arrow, when angle θ is equal to or greater than angle of repose A, the stability of powder 3 due to angle of repose A becomes low, and thus, the force with which powder 3 desires to stay on main surface 22c1 of squeegee 22c is likely to decrease. Therefore, it is possible to particularly suppress the stay or aggregation of powder 3 and occurrence of powder clogging.

Hereinafter, Modification Examples 1 and 2 of the squeegee configuration will be described.

Modification Example 1

In the modification example, the squeegee will be described. The modification example is different from Embodiment 1 in that the shape of the squeegee is circular in a side view. Unless otherwise specified, the other configurations in the modification example are the same as those in Embodiment 1, and the same configurations will be given the same reference numerals and the detailed description of the configurations will be omitted.

Figure 4:
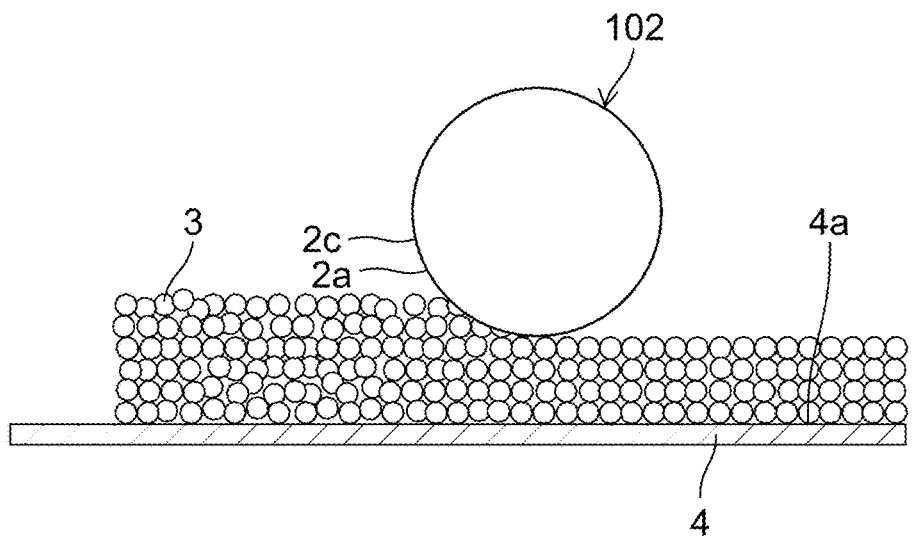
FIG. 4 is a schematic view illustrating a part of the powder applying apparatus according to the embodiment of the disclosure.

In the modification example, as illustrated in FIG. 4, squeegee 102 has a curved surface 2c, and has a shape in which main surface 2a extends from the end surface toward the upstream side in the moving direction of sheet 4. However, the shape of squeegee 102 is not limited thereto. Squeegee 102 may have an elliptical shape as long as the thickness of powder 3 can be adjusted, and may have a semicircular shape only on main surface 2a of Embodiment 1.

Other shapes of squeegee 102 will be described with reference to FIG. 4. Squeegee 102 may have a columnar shape as illustrated in FIG. 4. Specifically, squeegee 102 has preferably a columnar shape that is substantially parallel to surface 4a of sheet 4 and of which the axis is substantially parallel to curved surface 2c.

When powder 3 advances and comes into contact with the surface of squeegee 102, pressure is generated on powder 3. Accordingly, powder 3 stays and aggregates, and powder clogging is likely to occur. Since squeegee 102 has a columnar shape, the contact angle between powder 3 and squeegee 102 continuously increases, and finally becomes equal to or greater than the angle of repose. Accordingly, the pressure generated in powder 3 is gradually relaxed without having a singular point, and finally becomes equal to or greater than angle of repose and is released. Therefore, in a case where squeegee 102 has a columnar shape, powder 3 is less likely to stay and aggregate.

In a case where squeegee 102 has a columnar shape, the high frequency vibration direction in the vicinity of the ultrasonic band of squeegee 102 includes at least one of a component in the perpendicular direction and a component in the horizontal direction. In other words, squeegee 102 vibrates in at least one of the horizontal direction and the perpendicular direction.

In a case where squeegee 102 has a columnar shape, the horizontal direction is a direction substantially parallel to main surface 2a of squeegee 102. In the modification example, regarding the vibration in the horizontal direction, a transverse wave (a wave in the direction in which squeegee 102 vibrates by rubbing against powder 3) is likely to be transmitted to powder 3.

In a case where squeegee 102 has a columnar shape, the perpendicular direction is a direction perpendicular to main surface 2a of squeegee 102. In other words, the perpendicular direction is a direction perpendicular to the circumference of squeegee 102. Regarding the vibration in the perpendicular direction, a longitudinal wave (a wave in the vibration direction in which squeegee 102 approaches and is separated from powder 3) is likely to be transmitted to powder 3.

Figure 13B:
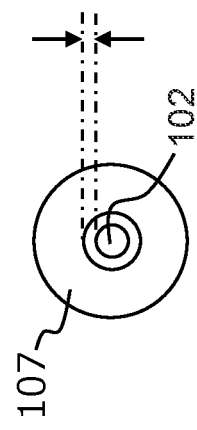
FIG. 13B is a schematic view illustrating a part of the powder applying apparatus according to an embodiment of the disclosure.
Figure 13A:
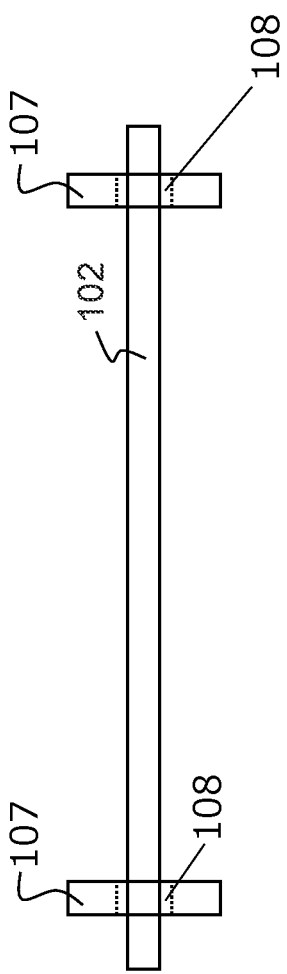
FIG. 13A is a schematic view illustrating a part of the powder applying apparatus according to an embodiment of the disclosure.

Columnar squeegee 102 may be fixed by, for example, a support with a bearing 107 such that both ends of squeegee 102 slide in the horizontal direction, as shown in FIGS. 13A and 13B. In this case, by inserting the axis of squeegee 102 into a circular bearing bore 108, the relationship of (amplitude in the horizontal direction)>(amplitude in the perpendicular direction) can be created.

In a case where squeegee 102 has columnar shape, the diameter of the column is preferably 4 mm or more and 300 mm or less. When the diameter is 4 mm or more, the change in angle is unlikely to occur suddenly, and the effect of continuously releasing pressure is likely to increase. When the diameter is 300 mm or less, the weight of squeegee 102 does not become extremely heavy, and squeegee 102 is easily linked to the movement of high frequency vibration in the vicinity of the ultrasonic band, and a sufficient vibration effect can be obtained.

Modification Example 2

In the modification example, squeegees 102 and 103 will be described. The modification example is different from Embodiment 1 in that squeegees 102 and 103 are multi-staged. Unless otherwise specified, the other configurations in the modification example are the same as those in Embodiment 1, and the same configurations will be given the same reference numerals and the detailed description of the configurations will be omitted.

Figure 5:
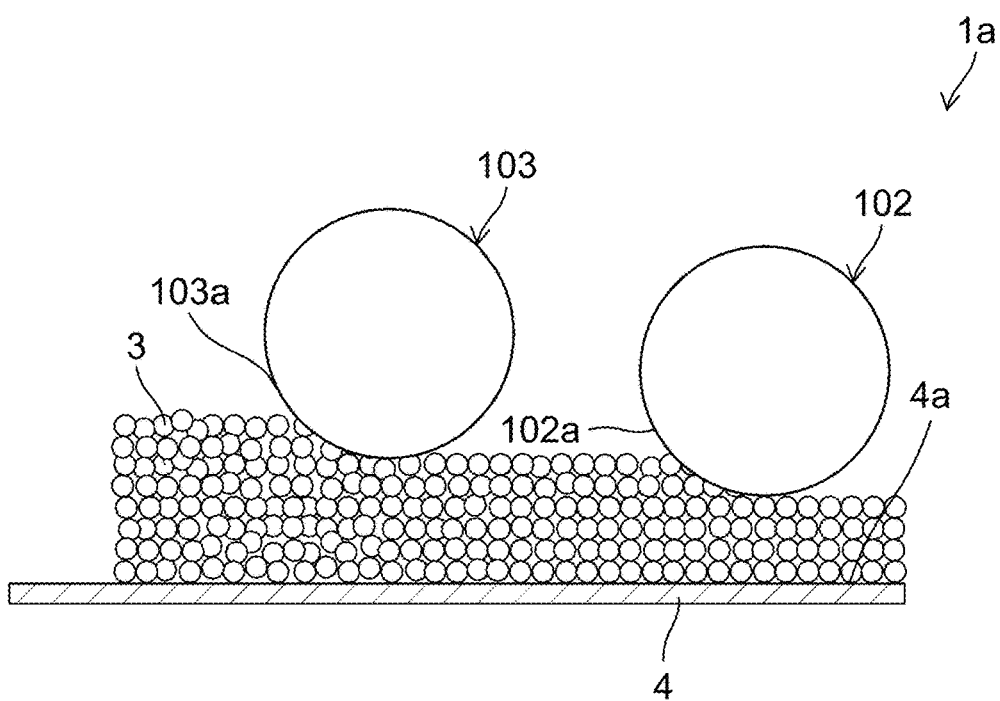
FIG. 5 is a schematic view illustrating a part of the powder applying apparatus according to the embodiment of the disclosure.

Other aspects of squeegees 102 and 103 will be described with reference to FIG. 5.

The ratio of the thickness of powder 3 before the thickness adjustment by squeegees 102 and 103 to the thickness of powder 3 after the thickness adjustment by squeegees 102 and 103 is preferably within the range of 1:1 to 3:1. In the modification example, the ratio of (thickness of powder before passing through squeegee 103)/(thickness of powder 3 after passing through squeegee 102) is smaller than 3, and accordingly, the amount of powder 3 positioned in front of squeegee 102 does not become extremely large, and the pressure that powder 3 receives from main surfaces 102a and 103a of squeegees 102 and 103 is likely to decrease. Therefore, the stay or aggregation of powder 3 is less likely to occur, and the powder clogging can further be suppressed. The ratio of (thickness of powder before passing through squeegee 103)/(thickness of powder 3 after passing through squeegee 103) and the ratio of (thickness of powder before passing through squeegee 102)/(thickness of powder 3 after passing through squeegee 102) is larger than 1, and accordingly, powder 3 can be excellently flattened by squeegees 102 and 103.

Squeegee 103 that adjusts the film thickness of powder 3 in advance before passing through squeegee 102 may be provided such that the ratio of the thickness of powder 3 before the thickness adjustment by squeegee 102 to the thickness of powder 3 after the thickness adjustment is within the above-described range.

The film thickness of powder 3 before passing through squeegee 103 may be adjusted in advance such that the ratio of the thickness of powder 3 before the thickness adjustment by squeegee 103 to the thickness of powder 3 after the thickness adjustment is within the above-described range.

Squeegee 103 is disposed on the downstream side of powder 3 in the moving direction from powder supplier 11 (hopper) and on the upstream side of powder 3 in the moving direction from squeegee 2 such that a predetermined gap larger than that between squeegee 102 and surface 4a is formed between squeegee 103 and surface 4a of sheet 4. As described above, powder applying apparatus 1 may have a multi-stage squeegee including the plurality of squeegees 102 and 103. In this case, since the thickness of powder 3 can be gradually adjusted, the stay or aggregation of powder 3 is less likely to occur, and the powder clogging can further be suppressed. Such a multi-stage squeegee structure is useful for powder having particularly low fluidity. As illustrated in FIG. 5, the multi-stage squeegee may include two squeegees, such as squeegee 103 and squeegee 102, and may include three or more squeegees.

Hereinafter, the description will be returned to the description of the embodiment.

Energy Device Manufacturing Method

Hereinafter, an energy device manufacturing method, which is an embodiment of the energy device manufacturing method according to the disclosure, will be described with reference to FIGS. 1 and 6. In the energy device manufacturing method, the energy device can be manufactured by using powder applying apparatus 1 as illustrated in FIG. 1.

Figure 6:
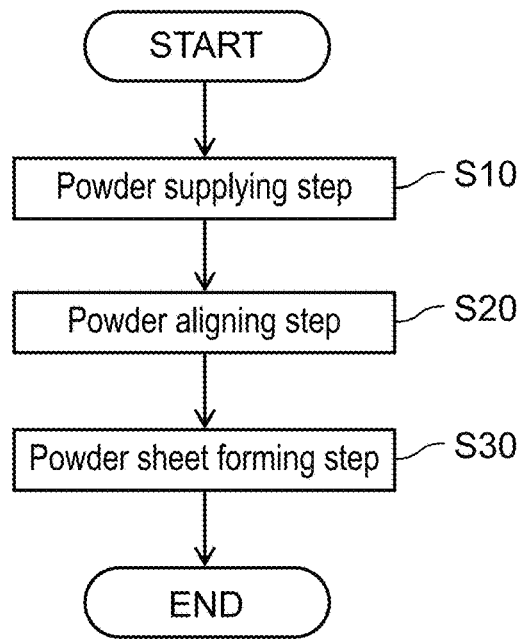
FIG. 6 is a diagram illustrating a manufacturing process of an energy device according to the embodiment of the disclosure.

As illustrated in FIGS. 1 and 6, the energy device manufacturing method includes: supplying (powder supplying step S10) powder 3 onto the surface of sheet 4 while moving sheet 4 for the energy device such as a current collector in a predetermined direction; and adjusting (powder aligning step S20) the thickness of powder 3 supplied onto the surface of sheet 4 by using squeegee 2.

First, in the energy device manufacturing method, powder 3 is produced. The raw material of powder 3 is not particularly limited, but for example, a particle group containing an active material may be used. Powder 3 is produced by mixing an active material and a binder with an appropriate additive (for example, a conductive material) added. As a method of mixing, for example, there is a method of mixing with a mortar, a ball mill, a mixer or the like. In particular, a method of mixing powder 3 without using a solvent or the like is preferable because there is no material deterioration.

In the powder supplying step S10, powder 3 is supplied onto the surface of sheet 4 by using powder supplier 11 such as a hopper while moving sheet 4 in a predetermined direction. Sheet 4 may have a shape of a sheet.

The powder aligning step S20 is a step of aligning powder 3 on surface 4a of sheet 4 by using squeegee 2 of powder applying apparatus 1. In other words, in the powder aligning step S20, the thickness of powder 3 supplied onto surface 4a of sheet 4 is adjusted to be flattened by using squeegee 2. At this time, squeegee 2 vibrates at a frequency of 2 kHz or more and 300 kHz or less.

The energy device manufacturing method further includes a powder sheet forming step S30. The powder sheet forming step S30 is a step of compressing powder 3 aligned on sheet 4 by using roll press 6 of powder applying apparatus 1. Accordingly, compressed powder layer 5 in which powder 3 is compressed is formed on surface 4a of sheet 4.

As described above, in the energy device manufacturing method, by sequentially performing the powder supplying step S10, the powder aligning step S20, and the powder sheet forming step S30, compressed powder layer 5 containing powder 3 on surface 4a of sheet 4 is formed. Such a laminate of sheet 4 and compressed powder layer 5 can be used for an energy device. For example, in a case where a current collector is used as sheet 4 and an active material is used as powder 3, electrodes for energy devices can be manufactured.

The energy device produced by using powder applying apparatus 1 can have compressed powder layer 5 having little variation in the thickness even when powder 3 having low fluidity is used. Therefore, according to the energy device manufacturing method, it is not necessary to perform a granulation step for improving the fluidity of powder 3, and thus, deterioration of the material can be prevented and the cost increase can be suppressed. Since the thickness of compressed powder layer 5 is uniform, the characteristics as an electrode in the energy device can be enhanced, and the energy device having excellent quality (output and the like) can be manufactured at low cost.

Positive and Negative Electrodes for Battery

Figure 7:
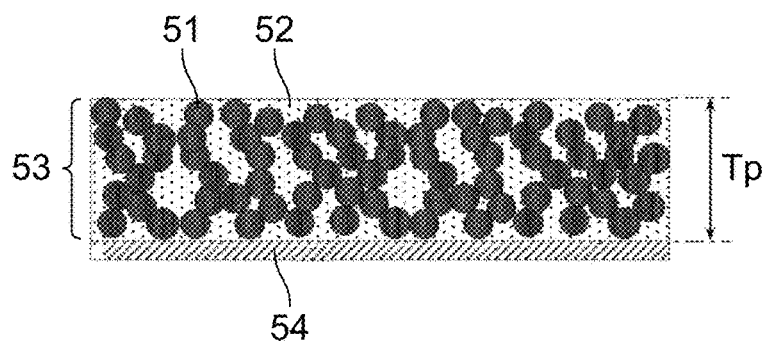
FIG. 7 is a sectional view of a positive electrode of an all-solid-state battery according to the embodiment of the disclosure.
Figure 8:
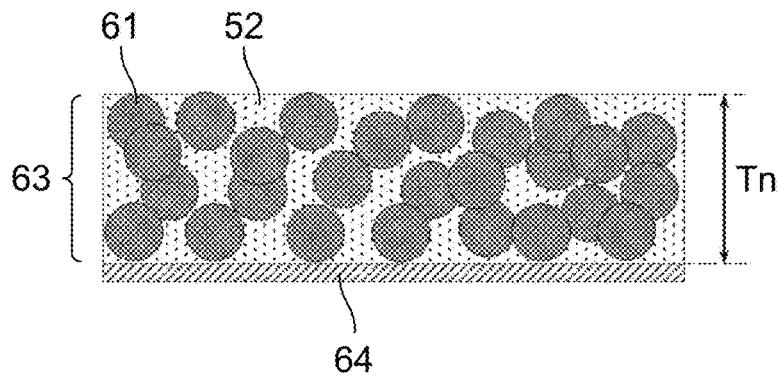
FIG. 8 is a sectional view of a negative electrode of the all-solid-state battery according to the embodiment of the disclosure.

Hereinafter, one embodiment of a positive electrode and a negative electrode for a battery according to the disclosure will be described with reference to FIGS. 7 and 8. FIG. 7 is a sectional view of the positive electrode of an all-solid-state battery according to the embodiment of the disclosure. FIG. 8 is a sectional view of a negative electrode of the all-solid-state battery according to the embodiment of the disclosure. The positive electrode and the negative electrode of the embodiment can be used for, for example, the all-solid-state battery.

As illustrated in FIGS. 7 and 8, the all-solid-state battery includes, for example, the solid electrolyte layer disposed between the pair of electrodes including the positive electrode and the negative electrode, and the pair of electrodes. The positive electrode includes positive electrode current collector 54 and positive electrode mixture layer 53. The negative electrode includes negative electrode current collector 64 and negative electrode mixture layer 63. Positive electrode mixture layer 53 and negative electrode mixture layer 63 can be produced by using the above-described powder applying apparatus 1. The negative electrode will be described later. The positive electrode is an example of the positive electrode layer or positive electrode mixture layer 53. The negative electrode is an example of the negative electrode layer or negative electrode mixture layer 63 described later.

As illustrated in FIG. 7, positive electrode mixture layer 53 is formed on positive electrode current collector 54 and includes positive electrode active material 51 and solid electrolyte 52 having ionic conductivity. Positive electrode mixture layer 53 and positive electrode current collector 54 form a positive electrode.

The concentration of the solvent contained in positive electrode mixture layer 53 is 50 ppm or less. In other words, positive electrode mixture layer 53 substantially does not contain a solvent. "Substantially does not contain" means a case of not containing at all and a case of inevitably containing at 50 ppm or less as impurities and the like. The solvent means an organic solvent. The method for measuring the solvent is not particularly limited, and the solvent can be measured by using, for example, gas chromatography, a mass change method, or the like. Examples of organic solvents include non-polar organic solvents such as heptane, xylene, and toluene, polar organic solvents such as tertiary amine solvents, ether solvents, thiol solvents, and ester solvents, and combinations thereof. Examples of the tertiary amine solvents include triethylamine, tributylamine, and triamylamine. Examples of ether solvents include tetrahydrofuran and cyclopentyl methyl ether. Examples of thiol solvents include ethane mercaptan. Examples of ester solvents include butyl butyrate, ethyl acetate, and butyl acetate.

The area of positive electrode mixture layer 53 is 900 $mm^2$ or more. The thickness of positive electrode mixture layer 53 is 15 μm or more.

The variation in thickness Tp of positive electrode mixture layer 53 is ±5% or less. In other words, in a case where the average film thickness of positive electrode mixture layer 53 is Tp, the minimum value and the maximum value of the film thickness of positive electrode mixture layer 53 are within the range of Tp±5%.

Since positive electrode mixture layer 53 is produced by using powder applying apparatus 1, even when the positive electrode mixture layer 53 is produced by using powder 3 (positive electrode active material 51 having a mean particle size of 50 μm or less and solid electrolyte powder) having low fluidity, the variation in the thickness of positive electrode mixture layer 53, which is compressed powder layer 5, is likely to decrease, and positive electrode mixture layer 53 is likely to be formed with a uniform thickness. Furthermore, by using powder applying apparatus 1, a large-sized high-capacity positive electrode mixture layer 53 having an area of 900 $mm^2$ or more and a thickness of 15 μm or more can be produced. Since positive electrode mixture layer 53 is produced by the solvent-free applying step, there is no damage due to the solvent. Therefore, regarding the positive electrode of the all-solid-state battery, it is possible to obtain a large-sized, high-capacity positive electrode mixture layer 53 having excellent quality with little film thickness variation and high output.

The mean particle size (D50) of positive electrode active material 51 is preferably 50 μm or less. By using an active material having a small particle size, the surface area can be increased and the capacity can be increased.

Solid electrolyte 52 in positive electrode mixture layer 53 preferably maintains an excellently dispersed state. In a case of observing the cross section of positive electrode mixture layer 53, the total area of the aggregator of solid electrolyte 52 having a cross-sectional area of 100 $μm^2$ or more is more preferably 2% or less of the cross-sectional area of positive electrode mixture layer 53. In this case, since solid electrolyte 52 is excellently dispersed in positive electrode mixture layer 53, solid electrolyte 52 can be utilized without waste, and positive electrode mixture layer 53 having high capacity characteristics can be obtained.

The dispersibility of solid electrolyte 52 can be enhanced by applying high frequency vibration in the vicinity of the ultrasonic band to squeegee 2 to flatten powder 3 containing solid electrolyte 52. Due to the high frequency vibration in the vicinity of the ultrasonic band, the high frequency vibration in the vicinity of the ultrasonic band is applied to powder 3 at the location where powder 3 on the upstream side of squeegee 2 is accumulated, and powder 3 flows while vibrating. This is because powders 3 are mixed with each other such that solid electrolyte 52 in powders 3 is excellently dispersed.

Positive electrode active material 51 is a substance in which metal ions such as lithium (Li) are inserted or removed from the crystal structure at a greater potential than that of the negative electrode, and oxidation or reduction is performed with the insertion or removal of metal ions such as lithium. The type of positive electrode active material 51 is appropriately selected according to the type of the all-solid-state battery, and examples thereof include an oxide active material and a sulfide active material.

As positive electrode active material 51 in the embodiment, for example, an oxide active material (lithium-containing transition metal oxide) is used. Examples of the oxide active material include $LiCoO_2$, $LiNiO_2$, $LiMn_2O_4$, $LiCoPO_4$, $LiNiPO_4$, $LiFePO_4$, $LiMnPO_4$, and a compound obtained by substituting a transition metal of a compound with one or two different elements. As the compound obtained by substituting the transition metal of the above-described compound with one or two different elements, known materials such as $LiNi_{1/3}Co_{1/3}Mn_{1/3}O_2$, $LiNi_{0.8}Co_{0.15}Al_{0.05}O_2$, and $LiNi_{0.5}Mn_{1.5}O_2$ are used. Positive electrode active material 51 may be used alone or in combination of two or more.

Examples of positive electrode active material 51 include particles and thin films. In a case where positive electrode active material 51 is in the form of particles, the mean particle size (D50) of positive electrode active material 51 is, for example, preferably in the range of 50 nm or more and 50 μm or less, and more preferably in the range of 1 μm or more and 15 μm or less. A range in which, by setting the mean particle size of positive electrode active material 51 to 50 nm or more, the handleability is likely to be improved, while by setting the mean particle size to 50 μm or less, a high-capacity positive electrode is easily obtained, is preferable. The "mean particle size" in the specification is a volume-based average diameter measured by a laser analysis and a scattering type particle size distribution measuring device.

The content of positive electrode active material 51 in positive electrode mixture layer 53 is not particularly limited, but is preferably within the range of 40% by weight or more and 99% by weight or less, and in this range, a range of 70% by weight or more and 95% by weight or less is more preferable.

The surface of positive electrode active material 51 may be coated with a coat layer. This is because the reaction between positive electrode active material 51 (for example, the oxide active material) and solid electrolyte 52 (for example, the sulfide-based solid electrolyte) can be suppressed. Examples of the material of the coat layer include Li ion conductive oxides such as $LiNbO_3$, $Li_3PO_4$, and LiPON. The average thickness of the coat layer is, for example, preferably within the range of 1 nm or more and 20 nm or less, and more preferably within the range of 1 nm or more and 10 nm or less.

The ratio of positive electrode active material 51 and solid electrolyte 52 contained in positive electrode mixture layer 53 is preferably within a range of 1 or more and 19 or less in terms of weight ratio in a case where (positive electrode active material)/(solid electrolyte)=weight ratio by the weight conversion, and is more preferably within a range of 2.3 or more and 19 or less. The reason why the range of this weight ratio is preferable is that it is easy to ensure both the lithium ion conduction path and the electron conduction path in positive electrode mixture layer 53.

Solid electrolyte 52 may be appropriately selected according to the conduction ion species (for example, lithium ion), and can be broadly divided into, for example, a sulfide-based solid electrolyte and an oxide-based solid electrolyte.

The type of the sulfide-based solid electrolyte in the embodiment is not particularly limited, but examples of the sulfide-based solid electrolyte include $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, and $Li_2S$—$P_2S_5$, and it is particularly preferable to contain Li, P, and S because the lithium ion conductivity is excellent. The sulfide-based solid electrolyte may be used alone or in combination of two or more. The sulfide-based solid electrolyte may be crystalline, amorphous, or glass ceramics. The above description of "$Li_2S$—$P_2S_5$" means a sulfide-based solid electrolyte made by using a raw material composition containing $Li_2S$ and $P_2S_5$, and the same is applied to other descriptions.

In the embodiment, one aspect of the sulfide-based solid electrolyte is sulfide glass ceramics containing $Li_2S$ and $P_2S_5$, and a molar ratio of $Li_2S$ and $P_2S_5$ is preferably within the range of 2.3 or more and 4 or less when $Li_2S$—$P_2S_5$=molar ratio is satisfied in terms of molars, and more preferably, within the range of 3 or more and 4 or less. The reason why the molar ratio is preferable is that the crystal structure has high ionic conductivity while maintaining the lithium concentration that affects the battery characteristics.

Examples of the shape of the sulfide-based solid electrolyte in the embodiment include a particle shape such as a true spherical shape and an elliptical spherical shape, and a thin film shape. In a case where the sulfide-based solid electrolyte material has a particle shape, the mean particle size (D50) of the sulfide-based solid electrolyte is not particularly limited, but it is easy to improve the filling rate in the positive electrode, and thus, the mean particle size (D50) is preferably 40 μm or less, more preferably 50 μm or less, and still more preferably 10 μm or less. Meanwhile, the mean particle size of the sulfide-based solid electrolyte is preferably 0.001 μm or more, and more preferably 0.01 μm or more. The mean particle size can be determined by, for example, image analysis using a particle size distribution meter or a scanning electron microscope (SEM).

Next, the oxide-based solid electrolyte in the embodiment will be described. The type of oxide-based solid electrolyte is not particularly limited, but LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, $Li_{1.5}Al_{0.5}Ge_{1.5}(P_4)_3$ and the like can be described. The oxide-based solid electrolyte may be used alone or in combination of two or more.

The all-solid-state battery in the embodiment includes, for example, positive electrode current collector 54 made of a metal foil or the like. Positive electrode current collector 54 includes, for example, a foil-like body, a plate-like body, or a mesh-like body made of aluminum, gold, platinum, zinc, copper, SUS, nickel, tin, titanium, or an alloy of two or more of these.

The thickness and shape of positive electrode current collector 54 may be appropriately selected depending on the use of the all-solid-state battery.

Next, the negative electrode will be described with reference to FIG. 8.

As illustrated in FIG. 8, negative electrode mixture layer 63 is formed on negative electrode current collector 64 and includes negative electrode active material 61 and solid electrolyte 52 having ionic conductivity. Negative electrode mixture layer 63 and negative electrode current collector 64 form a negative electrode.

The concentration of the solvent contained in negative electrode mixture layer 63 is 50 ppm or less. In other words, negative electrode mixture layer 63 substantially does not contain a solvent. "Substantially does not contain" means a case of not containing at all and a case of inevitably containing at 50 ppm or less as impurities and the like. The solvent means an organic solvent, and the example of the solvent contained in negative electrode mixture layer 63 is the same as the solvent exemplified as the solvent contained in positive electrode mixture layer 53. The method for measuring the solvent is not particularly limited, and the solvent can be measured by using, for example, gas chromatography, a mass change method, or the like.

The area of negative electrode mixture layer 63 is 900 mm$^2$ or more. The thickness of negative electrode mixture layer 63 is 15 μm or more.

The variation in the thickness Tn of negative electrode mixture layer 63 is ±10% or less. In other words, in a case where the average film thickness of negative electrode mixture layer 63 is Tn, the minimum and maximum values of the film thickness of negative electrode mixture layer 63 are within the range of Tn±10%.

Since negative electrode mixture layer 63 is produced by using powder applying apparatus 1, even when the negative electrode mixture layer 63 is produced by using powder 3 (negative electrode active material 61 having a mean particle size of 50 μm or less and solid electrolyte powder) having low fluidity, the variation in the thickness of negative electrode mixture layer 63, which is compressed powder layer 5, is likely to decrease, and negative electrode mixture layer 63 is likely to be formed with a uniform thickness. Furthermore, by using powder applying apparatus 1, a large-sized high-capacity negative electrode mixture layer 63 having an area of 900 mm$^2$ or more and a thickness of 15 μm or more can be produced. Since negative electrode mixture layer 63 is produced by the solvent-free applying step, there is no damage due to the solvent. Therefore, regarding the negative electrode of the all-solid-state battery, it is possible to obtain a large-sized, high-capacity negative electrode mixture layer 63 having excellent quality with little film thickness variation and high output.

The mean particle size (D50) of negative electrode active material 61 is preferably 50 μm or less. By using an active material having a small particle size, the surface area can be increased and the capacity can be increased.

Negative electrode active material 61 is a substance in which metal ions such as lithium are inserted or removed from the crystal structure at a lower potential than that of the positive electrode, and oxidation or reduction is performed with the insertion or removal of metal ions such as lithium.

As negative electrode active material 61 in the embodiment, known materials, such as alloyed metals with lithium (lithium, indium, tin, and silicon), carbon materials (hard carbon, graphite or the like), and oxide active material ($Li_4Ti_5O_{12}$, $SiO_x$ or the like) are used. As negative electrode active material 61, a composite or the like in which above-described negative electrode active material 61 is appropriately mixed may also be used.

The ratio of negative electrode active material 61 and solid electrolyte 52 contained in negative electrode mixture layer 63 is preferably within a range of 0.6 or more and 19 or less in terms of weight ratio in a case where negative electrode active material/solid electrolyte=weight ratio by the weight conversion, and is more preferably within a range of 1 or more and 5.7 or less. The reason why the range of this weight ratio is preferable is that it is easy to ensure both the lithium ion conduction path and the electron conduction path in negative electrode mixture layer 63.

The negative electrode in the embodiment includes, for example, negative electrode current collector 64 made of a metal foil or the like. Negative electrode current collector 64 includes, for example, a foil-like body, a plate-like body, or a mesh-like body made of SUS, gold, platinum, zinc, copper, nickel, titanium, tin, or an alloy of two or more of these.

The thickness and shape of negative electrode current collector 64 may be appropriately selected depending on the use of the all-solid-state battery.

Example 1

Hereinafter, the disclosure will be specifically described with reference to Example 1. The disclosure is not limited to the following Example 1.

For Example 1 and Comparative Example 1, experiments were conducted by using a powder having a squeegee having a columnar shape, an angle of repose of 45°, and a mean particle size of 1.5 μm, and the variation in powder film thickness after passing through the squeegee was compared. The result is illustrated in FIG. 10. The vibration frequency in FIG. 10 is the vibration frequency of the squeegee. The powder film thickness variation is a ratio of a value three times the standard deviation of the powder film thickness to the powder film thickness.

Example 2

Hereinafter, the disclosure will be specifically described with reference to Example 2. The disclosure is not limited to the following Example.

For Examples 2 to 5 and Comparative Examples 2 to 4, a simulation was performed in a case where a powder having a squeegee having a flat plate shape, an angle of repose of 46°, and a mean particle size of 10 μm was used, and the staying particle ratio was analyzed. The vibration frequency of the squeegee is 2.5 kHz. The result is illustrated in FIG. 11. The angle in FIG. 11 is an angle formed by the direction perpendicular to the sheet that transports the powder and the main surface of the squeegee. In Examples 2 to 5, the lower the stay powder ratio, the more stable the coating film is possible. The stay powder ratio is the ratio of the powder that stays due to the squeegee, and is the ratio of the number of powders having a rate of 15% or less of the powder transport speed to the total number of powders. When the stay powder ratio is high, the powder clogging in the squeegee is induced, and the film thickness variation of the powder coating film is induced.

According to still another aspect of the disclosure, there is provided a negative electrode for a battery including: a negative electrode current collector; and a negative electrode layer containing a negative electrode active material and formed on the negative electrode current collector, in which a concentration of a solvent contained in the negative electrode layer is 50 ppm or less, an area of the negative electrode layer is 900 mm$^2$ or more, a thickness of the negative electrode layer is 15 μm or more, and a variation in the thickness of the negative electrode layer is ±10% or less.

In the negative electrode for a battery described above, the negative electrode layer includes a negative electrode mixture layer that contains the negative electrode active material and a solid electrolyte with ionic conductivity and is formed on the negative electrode current collector, a concentration of a solvent contained in the negative electrode mixture layer is 50 ppm or less, an area of the negative electrode mixture layer is 900 mm$^2$ or more, a thickness of the negative electrode mixture layer is 15 μm or more, and a variation in the thickness of the negative electrode mixture layer is ±10% or less.

Since the powder applying apparatus of the disclosure can produce a uniform powder layer with little variation in the film thickness without a solvent, the powder applying apparatus can also be applied to applications such as a mixture layer or the like of a high-quality all-solid-state battery.

What is claimed is:

1. A powder application apparatus comprising:
a driver configured to move a member in a predetermined direction;
a powder supplier configured to supply powder onto a surface of the member;
a squeegee positioned at a distance from the member, the squeegee being configured to adjust a thickness of the powder supplied onto the surface of the member by the powder supplier; and
an ultra-high frequency vibration generator connected to the squeegee,
wherein:
the ultra-high frequency vibration generator is configured to make the squeegee vibrate at a frequency of 2 kHz or more and 300 kHz or less;
the squeegee has a columnar shape having an axis parallel to the surface of the member and orthogonal to a moving direction of the surface of the member; and
the ultra-high frequency vibration generator is configured to make the squeegee vibrate in a horizontal direction which is both parallel to a main surface of the squeegee and substantially parallel to the axis of the squeegee and in a perpendicular direction which is perpendicular to the main surface of the squeegee such that a magnitude of vibration in the horizontal direction is larger than a magnitude of vibration in the perpendicular direction.

2. The powder application apparatus of claim 1, wherein the powder has a mean particle size (D50) of 0.005 μm or more and 50 μm or less.

3. The powder application apparatus of claim 1, wherein the ultra-high frequency vibration generator is configured to make the squeegee vibrate such that a ratio of the thickness of the powder before thickness adjustment by the squeegee to the thickness of the powder after the thickness adjustment by the squeegee is within a range of 1:1 to 3:1.

4. The powder application apparatus of claim 1, further comprising:
a presser for compressing the powder on the member after the thickness of the powder has been adjusted by the squeegee.

5. The powder application apparatus of claim 1, wherein a diameter of the squeegee is 4 mm or more and 300 mm or less.

6. A powder application apparatus comprising:
a driver configured to move a member in a predetermined direction;
a powder supplier configured to supply powder onto a surface of the member;
a squeegee positioned at a distance from the member, the squeegee being configured to adjust a thickness of the powder supplied onto the surface of the member by the powder supplier;
a bearing configured to receive an end of the squeegee; and
an ultra-high frequency vibration generator connected to the squeegee,
wherein:
the ultra-high frequency vibration generator is configured to make the squeegee vibrate at a frequency of 2 kHz or more and 300 kHz or less;
the squeegee has a columnar shape having an axis parallel to the surface of the member and orthogonal to a moving direction of the surface of the member;
the axis of the squeegee is inserted into a circular bearing bore; and
the ultra-high frequency vibration generator is configured to make the squeegee vibrate in a horizontal direction which is both parallel to a main surface of the squeegee and substantially parallel to the axis of the squeegee and in a perpendicular direction which is perpendicular to the main surface of the squeegee such that a magnitude of vibration in the horizontal direction is larger than a magnitude of vibration in the perpendicular direction.

* * * * *